United States Patent [19]

Smith, Jr.

[11] 4,005,574
[45] Feb. 1, 1977

[54] REVERSE PITCH FAN WITH DIVIDED SPLITTER

[75] Inventor: Leroy H. Smith, Jr., Cincinnati, Ohio

[73] Assignee: The United States of America as represented by the Administrator of the National Aeronautics and Space Administration, Washington, D.C.

[22] Filed: Apr. 21, 1975

[21] Appl. No.: 569,925

[52] U.S. Cl. .................................. 60/226 A; 60/228
[51] Int. Cl.² ............................................ F02K 3/06
[58] Field of Search ............. 60/226 A, 226 R, 224, 60/228

[56] References Cited
UNITED STATES PATENTS

| | | | |
|---|---|---|---|
| 3,489,338 | 1/1970 | Chilman | 60/226 R |
| 3,494,129 | 2/1970 | Krebs et al. | 60/226 R |
| 3,528,241 | 9/1970 | Venable et al. | 60/226 R |
| 3,720,060 | 3/1973 | Davies et al. | 60/226 R |
| 3,747,343 | 7/1973 | Rosen | 60/226 R |

*Primary Examiner*—Carlton R. Croyle
*Assistant Examiner*—Robert E. Garrett
*Attorney, Agent, or Firm*—Robert C. Lampe, Jr.; John R. Manning; Norman T. Musial

[57] ABSTRACT

A gas turbofan engine including a variable pitch fan is provided with flow straightening means which are adapted to reduce fan exit swirl in the forward thrust mode. The flow straightening means are so arranged to produce low losses in the fluid entering a core engine during reverse thrust operation while allowing large supercharging of the core engine during forward thrust operation.

7 Claims, 7 Drawing Figures

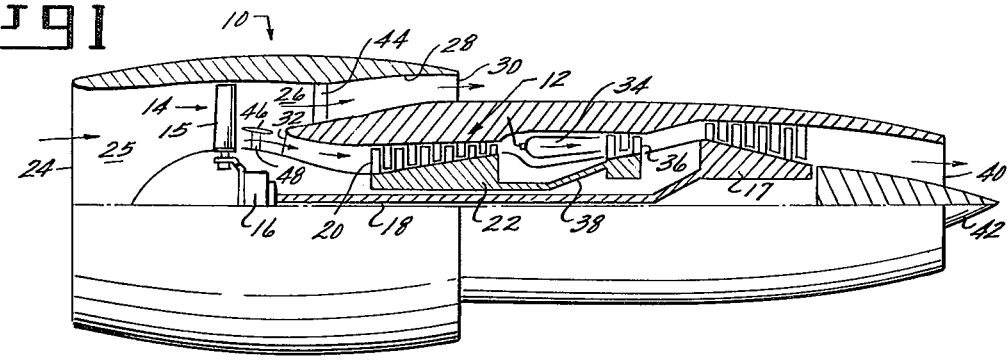
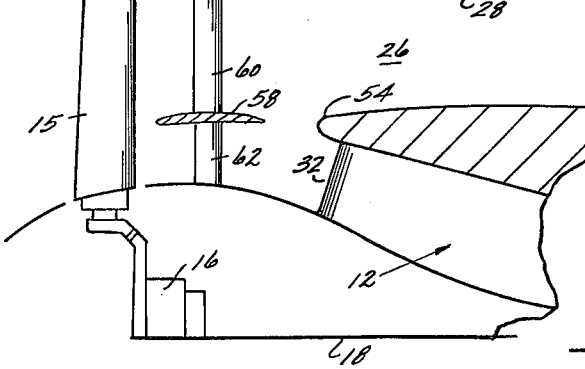
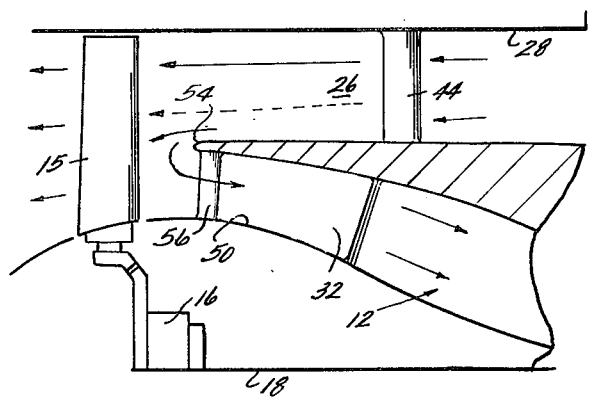
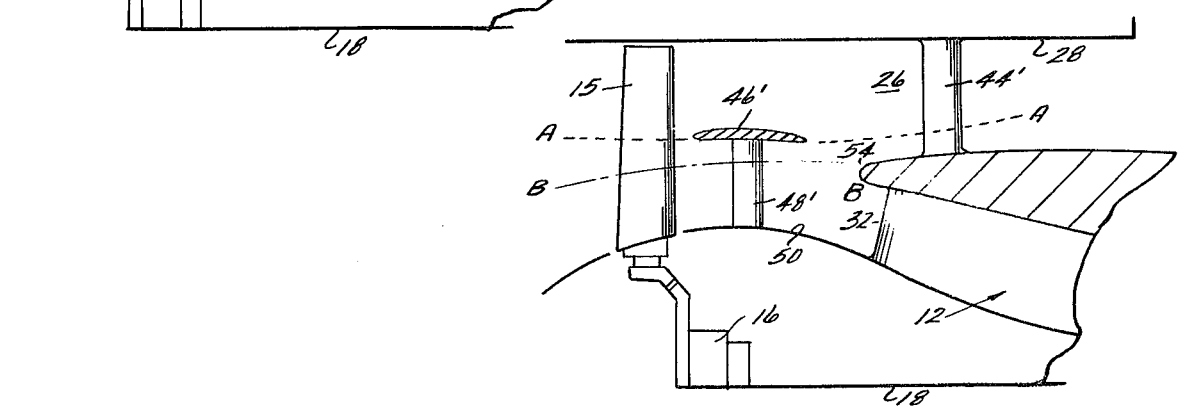

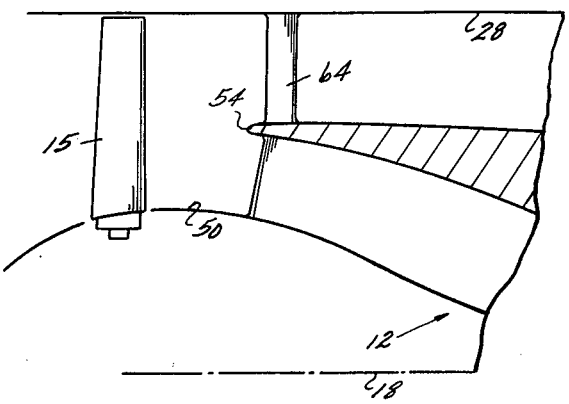
_Fig 6_  _PRIOR ART_
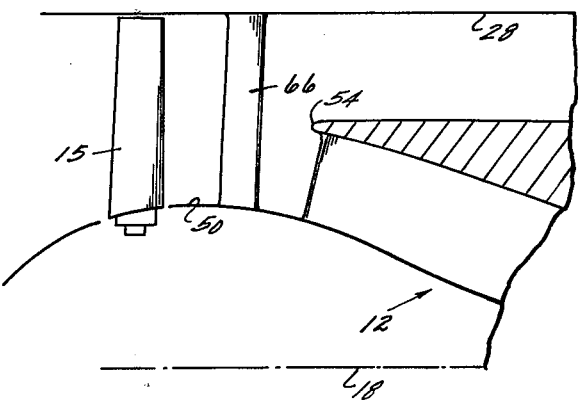
_Fig 7_  _PRIOR ART_

REVERSE PITCH FAN WITH DIVIDED SPLITTER

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates of reverse thrust gas turbofan engines and, more particularly, to an outlet guide vane arrangement for use therein.

A major feature of future gas turbine engines will be their ability to change the direction of fan thrust by reversing the direction of flow through the fan. This will be accomplished through the incorporation of what is known as a variable pitch fan. However, it is becoming clear that more is involved in such a concept than the mere addition of a variable pitch fan to an existing, state-of-the-art gas turbine core engine. One of the subtle problems facing the industry is to find an efficient method of providing the core engine with a motive fluid stream, typically air, in both the forward and reverse thrust modes.

In particular, in such advanced engines it is contemplated that a variable pitch fan will be used to pressurize a large quantity of air in much the same manner as a conventional turbofan engine when the variable pitch fan is operating in its forward thrust mode. Typically, the majority of this air passes through a bypass duct surrounding a core engine to provide the greater part of the engine's forward thrust. The remaining air passes through an inner core duct to the core engine which drives the fan through turbine and shaft connection. In the reverse thrust mode, the direction of engine thrust is reversed to aid in aircraft braking, for example. In this mode, the pitch of the fan blades is set such that the air is drawn back through the bypass duct in the opposite direction (the direction of fan rotation remaining unchanged). The majority of the air is expelled out of what is normally the inlet of the engine. However, in order for the core engine to continue driving the fan, it must be continually supplied with a motive fluid source in the reverse thrust mode. Accordingly, a portion of the bypass duct flow is bled off and turned, essentially 180°, to enter the core engine duct.

Guide vanes are normally provided in gas turbofan engines to turn the absolute flow angle (swirl) back to the axial direction after being pressurized by the fan in order to maximize forward thrust in the bypass portion and to provide for axial flow entering the core engine. It is the presence of these necessary guide vanes which creates a problem in the reverse thrust mode.

In some contemplated reverse-thrust engines the flow is required to pass through guide vanes twice during its circuitous route to the core engine. First it must traverse backwards those guide vanes or portions of guide vanes associated with the bypass duct, and then traverse in the forward direction those guide vanes, or portion thereof, associated with the core engine duct. Since the camber of the latter guide vanes will be in the wrong direction during the reverse mode (absent variable geometry guide vanes), high pressure losses are expected with detrimental results in core engine performance. The higher the pressure ratio of the fan (the higher its aerodynamic loading) the greater the camber required on the guide vanes to straighten the flow in the forward thrust mode, and the more severe the problem in the reverse thrust mode.

In other contemplated reverse-thrust engines, the fan guide vane arrangement is such that a non-constant radial energy distribution by the fan could cause a stalling condition in the guide vanes, while still other arrangements require very high guide vane camber with attendant high losses. Concern over these matters has necessitated a search for a solution to the problem.

SUMMARY OF THE INVENTION

Accordingly, it is the primary object of the present invention to provide an improved guide vane structure whereby gas turbofan engine performance is improved in the reverse thrust mode.

This and other objects and advantages will be more clearly understood from the following detailed description, drawings and specific examples, all of which are intended to be typical of rather than in any way limiting to the scope of the present invention.

Briefly stated, the above objective is accomplished, in one form, by disposing an annular island between the variable pitch fan and a flow splitter which serves to split the flow into the bypass and core engine portions. A first stage of guide vanes (inner guide vanes) is positioned beneath the island where it aerodynamically effects that portion of the fan flow which enters the core engine. A second stage of guide vanes is disposed across the bypass duct where it reduces the swirl of the bypass flow. The island is displaced axially from the splitter such that a gap exists therebetween. In the reverse thrust mode, all of the flow passes through the bypass guide vanes. A portion is drawn through the gap and into the core engine without passing through the inner guide vanes, thereby reducing pressure losses. By judicious selection of the radial height of the island it becomes apparent that the flow of motive fluid need only pass through any stage of guide vanes once in either the forward or reverse thrust modes.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiments which is given by way of example with the accompanying drawings in which:

FIG. 1 is a schematic representation of a gas turbofan engine incorporating one embodiment of the subject invention;

FIG. 2 is an enlarged schematic view of a portion of the gas turbofan engine of FIG. 1;

FIG. 3 is a schematic representation, similar to FIG. 2, of another possible gas turbofan engine configuration;

FIG. 4 is a schematic representation, similar to FIG. 2, of yet another possible gas turbofan engine configuration;

FIG. 5 is a schematic representation, similar to FIG. 2, of a gas turbofan engine incorporating a second embodiment of the subject invention;

FIG. 6 is a schematic representation, similar to FIG. 2, of a prior art gas turbofan engine; and FIG. 7 is a schematic representation, similar to FIG. 2, of yet another prior art gas turbofan engine.

DESCRIPTION OF THE PREFERRED EMBODIMENT

Referring to the drawings wherein like numerals correpsond to like elements throughout, reference is first directed to FIG. 1 wherein an engine depicted generally at 10 embodying the present invention is diagrammatically shown. This engine may be considered as comprising generally a core engine 12, and a fan assembly 14 including a stage of variable pitch fan blades 15 and a fan pitch actuation mechanism 16. The engine includes a fan turbine 17 which is interconnected to the fan assembly 14 by shaft 18. The core engine 12 includes compressor 20 having a rotor 22. Air enters inlet 24 of fan duct 25 and is initially compressed by fan assembly 14. A first portion of this compressed air enters the fan bypass duct 26 defined, in part, by core engine 12 and a circumscribing fan nacelle 28 and discharges through a fan nozzle 30. A second portion of the compressed air enters core engine inlet 32, is further compressed by the compressor 20 and then is discharged to a combustor 34 where fuel is burned to provide high energy combustion gases which drive a turbine 36. The turbine 36, in turn, drives the rotor 22 through a shaft 38 in the usual manner of a gas turbine engine. The hot gases of combustion then pass to and drive the fan turbine 17 which, in turn, drives the fan assembly 14. A propulsive force is thus obtained by the action of the fan assembly 14 discharging air from the bypass duct 26 through the fan nozzle 30 and by the discharge of combustion gases from the core engine nozzle 40 defined, in part, by plug 42. The above description is typical of many present-day gas turbine engines and is not meant to be limiting, but merely illustrative of one type of application of the present invention.

Continuing with the description of the embodiment of the invention as depicted in FIG. 2, it is shown therein that flow straightening means are provided to reduce the absolute flow angle (swirl) exiting the variable pitch fan 15 when it is operating in the forward thrust mode. In part, the flow straightening means includes a stage of cambered bypass guide vanes (outer vane means) 44 disposed within the bypass duct 26.

Immediately behind the fan blades 15, in the hub region, is a fan duct dividing means in the form of an annular ring or island 46. A stage of cambered inner guide vanes (inner vane means) 48 are disposed in the annular space between the underside of the island and the fan duct inner wall 50. The island 46 and inner guide vanes 48 comprise the remainder of the flow straightening means. A full-circumference axial gap 52 separates the island 46 from the leading edge of splitter 54 which separates bypass duct 26 from core engine inlet 32 and therefore the bypass portion of the flow from the core portion. While an axial gap 52 is depicted, it is anticipated that a plurality of apertures such as slots or holes would serve equally well in certain applications.

The island configuration permits the attainment of a high hub supercharging pressure ratio for forward pitch (forward thrust) operation without causing a large core flow pressure drop during reverse pitch (reverse thrust) operation. In the forward thrust mode of operation a vortex sheet is shed from the trailing edge of the island 46 in the form of a swirl angle discontinuity since most, if not all, of the swirl in the flow under the island is removed by the inner guide vanes 48. The total pressure on top of the island differs from that under the island only by the total pressure losses caused by the inner guide vanes 48. Hence, the Mach numbers of the two streams are nearly the same. While one commercial aircraft gas turbofan engine incorporates an island structure with a fixed pitch fan, the bypass guide vanes are on top of the island and there is no swirl in the bypass flow at the island trailing edge. (Such a configuration is depicted in U.S. Pat. No. 3,494,129 — Krebs et al., and is assigned to the same assignee as the present invention.) Therein, a vortex sheet is also shed from the trailing edge of the island. However, this vortex sheet is in the form of a velocity magnitude discontinuity. The swirl angle is zero both on top of and under the island but the total pressures differ by the work input accomplished by a rotating stage of compressor blades also disposed beneath the island. Thus, the orientation of the vortex vectors in the vortex sheet of such engine and that of the present invention are rotated approximately 70°.

A major feature of future gas turbofan engines will be their ability to change the direction of thrust by reversing the direction of flow through the fan. This flow reversal affects the pressure level into the core engine (and, hence, the core engine's ability to produce power) in two ways. First, there is the direct loss of the fan hub (radially inner portion) supercharging pressure which is obviously related to the magnitude of the forward thrust mode fan hub pressure ratio. Secondly, there is the loss associated with inducting the flow into the core engine 20 through and past such loss-producing mechanisms as guide vanes and splitter leading edges.

FIG. 3 depicts schematically a portion of a gas turbofan engine which, for the sake of illustration, has been configured with a variable pitch fan instead of its original fixed pitch fan. The engine is shown to incorporate bypass guide vanes 44 similar to those of the present invention and a stage of inner guide vanes 56 within core duct 32 and ahead of core engine 12. In the reverse thrust mode wherein the flow direction is indicated by the arrows, it is apparent that any flow entering the core engine must first pass through two stages of guide vanes (44 and 56) and negotiate the leading edge of splitter 54 in between.

The second pressure loss previously mentioned is also related to the magnitude of the forward thrust mode fan hub pressure ratio since this pressure ratio is the determining factor in establishing the degree of camber of the guide vanes 56. When operating in the reverse thrust mode, the camber of guide vanes 56 is in the wrong direction for efficient aerodynamic performance and the higher the fan hub supercharging in the forward thrust mode, the worse the effect of the camber in the reverse thrust mode.

FIGS. 6 and 7 schematically depict reverse thrust fan configurations which have been suggested in the past. In the arrangement of FIG. 6, guide vanes 64 are disposed in the bypass duct 26 only. The difficulty with FIG. 6 is that it would only be viable where low fan hub loadings were employed. With high fan hub loadings, excessively high swirl angles would cause high losses in the duct leading to the core engine. The arrangement of FIG. 7 incorporates a stage of guide vanes 66 disposed across the entire fan duct 25 between fan blades 15 and splitter 54 leading edge. In such a configuration, there would be a uniform high back pressuring (high static pressure) behind the guide vanes 66 due to the normally higher pressure ratio of the fan tip than the fan hub. This would result in stalling of the guide vanes.

The configuration of FIG. 4 offers no solution to the dilemma. As schematically depicted, an island 58 is disposed between essentially concentric stages of outer and inner guide vanes, 60 and 62, respectively. Essentially the same problems exist as previously discussed with reference to FIG. 7 in that there would be a uniform high back pressuring behind both the outer and inner guide vanes resulting in a stalling of the inner guide vanes.

The advantage of the present invention, for example, as embodied in FIGS. 1 and 2, is that flow can enter the core compressor 20 through the axial gap 52 between the island 46 and splitter 54 and thereby avoid the problem of adversely oriented camber of inner guide vanes 48. Obviously, this path is much less restrictive. Furthermore, the bluntness of the splitter 54 leading edge, compared with the island 46 leading edge (which would be the splitter leading edge if the axial gap were filled), is conducive to minimizing losses associated with reversing the axial component of the core portion of the flow from its forward direction in the bypass duct 26 to its aft direction in the core duct 32.

FIG. 5 schematically depicts another embodiment of the present invention. Instead of the island 46 being radially aligned such that all of the flow passing under the island enters core duct 32 as in FIGS. 1 and 2, the island is displaced further outward radially. Consequently, dotted line A—A represents the fluid streamlines intercepted by island 46' and dashed line B—B depicts the fluid streamlines intercepted by the leading edge of the splitter 54. In such a configuration, enough of the flow passing under the island 46' (between streamlines A—A and B—B) also passes into the bypass duct 26 to make it desirable to use small camber in the bypass guide vanes 44' locally (between streamline A—A and splitter 54) to better match the low swirl angle exiting guide vanes 48'. This small camber in guide vanes 44' has the advantage that it gives less undesirable swirl to the flow passing through guide vanes 44' and into the core engine 12 when the fan is operating in the reverse mode.

It should be obvious to one skilled in the art that certain changes can be made to the above-described invention without departing from the broad, inventive concepts thereof. For example, as previously discussed, the gap 52 may be replaced with a plurality of openings in certain applications. Additionally, guide vanes could be incorporated into frame structure where practical to eliminate redundancy of hardware. It is intended that the appended claims cover these and all similar variations in Applicant's invention.

What I claim is:

1. A gas turbofan engine including:
    a core engine;
    a substantially annular fan duct having an inner wall and an outer wall;
    a variable pitch fan disposed in said fan duct and adapted to pressurize a motive fluid in a forward thrust mode and a reverse thrust mode;
    flow splitter means disposed within said fan duct and adapted to partially define a core engine duct, for receiving a core flow portion of said motive fluid, and a surrounding bypass duct;
    means disposed within said fan duct axially forward of said flow splitter means to define a circumferentially disposed opening therebetween;
    outer vane means disposed within said bypass duct; and
    inner vane means disposed forward of said opening to effect swirl angle reduction of said core flow portion in the forward thrust mode prior to entering said core duct, but not substantially in the reverse thrust mode.

2. The gas turbofan engine of claim 1 wherein said means disposed axially forward of said flow splitter means includes circumferential ring means and said circumferentially disposed opening includes a circumferentially extending axial gap adapted to pass said core flow portion only in the reverse thrust mode.

3. The gas turbofan engine of claim 2 wherein said inner vane means are disposed between said ring means and said inner wall.

4. The gas turbofan engine of claim 2 wherein said splitter means is radially positioned such that substantially all of said core flow portion is adapted to pass through said inner vane means in the forward thrust mode.

5. The gas turbofan engine of claim 4 wherein said inner vane means are configured to produce essentially zero flow swirl in the forward thrust mode.

6. The gas turbofan engine of claim 2 wherein said ring means is radially positioned such that in the forward pitch mode:
    a first determined portion of fluid passing through said inner vane means, comprising said core flow portion, is adapted to enter said core duct; and
    a second predetermined portion of fluid passing through said inner vane means is adapted to enter said bypass duct.

7. The gas turbofan engine of claim 6 wherein said outer vane means are aerodynamically tailored to swirl angle of said second predetermined portion of fluid.

* * * * *